United States Patent [19]

Blaskovitz et al.

[11] Patent Number: 5,126,176
[45] Date of Patent: Jun. 30, 1992

[54] LIDDING FOR CONTAINERS

[75] Inventors: Karen U. Blaskovitz, Wilmington; Stephen R. Tanny, Newark, both of Del.

[73] Assignee: E. I. Du Pont de Nemours and Company, Wilmington, Del.

[21] Appl. No.: 640,591

[22] Filed: Jan. 18, 1991

Related U.S. Application Data

[63] Continuation-in-part of Ser. No. 485,591, Feb. 27, 1990, abandoned.

[51] Int. Cl.⁵ .............................................. B65D 43/00
[52] U.S. Cl. ................................ 428/36.92; 428/35.7; 428/95; 428/349; 428/355; 428/461; 428/463; 428/513; 428/514; 428/516; 428/520; 525/221
[58] Field of Search ............... 428/36.92, 35.7, 461, 428/463, 95, 349, 355, 373, 514, 516, 520; 524/109; 525/221

[56] References Cited

U.S. PATENT DOCUMENTS

| | | | |
|---|---|---|---|
| 4,430,468 | 2/1984 | Schumacher | 428/95 |
| 4,521,467 | 6/1985 | Berger | 428/520 |
| 4,656,068 | 4/1987 | Raines | 428/36.92 |
| 4,680,340 | 7/1987 | Oreglia et al. | 525/72 |
| 4,684,554 | 8/1987 | Ou-Yang | 428/349 |
| 4,686,133 | 8/1987 | Nakabayashi | 428/355 |
| 4,859,514 | 8/1989 | Friedrich | 428/349 |
| 4,944,409 | 7/1990 | Busche | 428/516 |
| 5,023,121 | 6/1991 | Pockat | 428/516 |

OTHER PUBLICATIONS

Research Disclosure; 27,770; May 1987.

*Primary Examiner*—James J. Seidleck
*Assistant Examiner*—Rena L. Dye

[57] ABSTRACT

Lidding of a sealant layer adhered to a substrate is provided wherein the sealant layer is a blend of ethylene/unsaturated ester copolymer with ethylene/unsaturated acid/unsaturated ester terpolymer, and wherein the sealant layer provides a peel strength of 500 to 2200 g/cm² to a wide variety of container materials, with the peel strength being substantially insensitive to operating variations in seal temperature, and the sealant layer has a higher cohesive strength than the peel strength of its seal to the container material.

19 Claims, 7 Drawing Sheets

LIDDING FOR CONTAINERS

CROSS REFERENCE TO RELATED APPLICATION

This application is a continuation-in-part of patent application Ser. No. 07/485,591, now abandoned, filed Feb. 27, 1990 by the same inventors.

BACKGROUND OF THE INVENTION

1. Field of the Invention

This invention relates to a lidding for containers.

2. Description of Related Art

As packaging technology has progressed and the desire for security and wholesomeness of packaged products for human intake has increased, improved lidding for containers has been developed, comprising a substrate and sealant which is heat sealed to the container. This seal is generally accomplished by placing the lidding on the container to cover its opening and applying heat and pressure through the lid to soften the sealant sufficiently to form the seal between the lidding and the lip of the container surrounding its opening. Unfortunately, the seal is often so strong that the lidding is difficult to remove, requiring puncturing of the lidding with a sharp instrument to enable at least the central part of the lidding to be torn away, often leaving portions of lidding still adhered to the lip surrounding the container opening.

Ideally, the lidding should provide a seal to the container that is simultaneously strong enough to provide a secure closure to the container yet also be weak enough to be easily removed from the container such that there is no residue left on the container lip.

The difficulty in obtaining this ideal condition arises from the nature of the container sealing process and the response of existing lidding sealants, notably copolymers of ethylene and an unsaturated ester such as vinyl acetate or methyl acrylate, to this process. The seal strength of existing sealants have been either too low with respect to many of the common container materials or too sensitive to the sealing temperature. In the latter case, as seal temperature is increased, the seal strength sharply increases, leading to the loss of lidding peelability. Attempts to decrease seal strength by decreasing sealing temperature invariably jeopardizes the integrity of the seal.

Compounding the problem of seal strength temperature sensitivity is the problem of seal temperature variation inherent in the sealing process. In common sealing types of operations, the interface is heated by exposure of the exterior of the lidding material to a heated bar or platen. The temperature at the interface depends upon the temperature of the heated platen, the thickness of the lidding and its ability to conduct heat and the length of time that the platen contacts the lid. It is economically advantageous to attempt to seal the lid to the container as fast as possible. Thus, it is commonly found that sealing operations use very hot platens and very short contact times. Small changes in contact times or fluctuations in the thickness of the lidding can dramatically affect the temperature of the interface and, thus, the resultant strength of the seal. Changes in the temperature of the platen can also affect the strength of the seal. While technology has been developed to provide accurate control of platen temperature, equipment that is older or has not been adequately maintained may result in substantial variation in platen temperature. While providing the heat to achieve the seal, the platen also applies pressure to the lidding to obtain intimate contact between the sealant and the container.

Another disadvantage of existing sealants is that the peel strength to containers of different materials, e.g., of polyethylene, polypropylene, polyester, polystyrene, varies just because of the varying ability of the sealants to adhere to these different materials. Thus, sealants of different compositions have been required depending on the container material involved.

Thus, it is clearly desirable for a sealant to exist which has greater universality of application, i.e., adheres to a wide variety of materials, which is relatively insensitive insofar as peel strength is concerned to heat seal temperature variations, and which provides seal characteristics whereby the seal has both integrity to protect the container contents and easy peelability.

Numerous polymer-based adhesives are available for bonding two layers of dissimilar materials together such as by extruding molten adhesive into the nip formed by converging films of these layers. The rolls which form this nip force the molten adhesive against both films and thereby bond them together via the adhesive. The heat required for forming this bond is provided by the molten adhesive which is controllable via temperature control of the extruder melting the adhesive and forcing it into the nip between the films. This type of adhesive bonding is called extrusion lamination and the purpose of this bonding is to prevent peelability, i.e., to prevent the separation of one film from the other. This result is achieved, in part, by the high temperature used in extrusion lamination, as established by the molten adhesive, as compared to the lidding sealing process. Generally, the lidding sealing process will be carried out at a platen temperature which is usually at least 50° F. less than the typical extrusion melt temperature for a resin of the same composition.

Research Disclosure 27 770 (May, 1987) discloses various polymers and blends thereof used for extrusion lamination of polypropylene to either aluminum foil or a polyvinylidene chloride film. Blends of acrylate copolymers with terpolymer are disclosed as offering a better combination of simultaneous bondability to aluminum foil and other substrates than do blends with ethylene/acid copolymers. No mention is made in this reference of applying any of these extrusion lamination adhesives to lidding utility or to the special conditions and problems unique to this utility as described above, including the need to achieve a seal between lidding and container at a sealing temperature range substantially less than the extrusion melt temperature of the adhesive, where the seal has both integrity and peelability.

U.S. Pat. No. 4,680,340 discloses an approach to solve the problem of the need for seal integrity and easy peelability by having the sealant consist of a blend polymer such as ionomer or ethylene/vinyl acetate copolymer of melt flow index less than 5 with a polymer such an LDPE, ethylene/vinyl acetate copolymer, and acid-modified ethylene/vinyl acetate copolymers such as BYNEL ® available from Du Pont having a melt flow index greater than 20. This variation in melt flow index of the two polymer components of the blend together with the selection of components for the blend results in low cohesive strength of the sealant. The easy peel characteristics of this sealant occurs by cohesive failure of the sealant. The disadvantage of the cohesive failure approach is that residue can be left on the lip of the opening of the container rather than leaving a smooth, clean appearing container lip surface when the lidding is removed.

SUMMARY OF THE INVENTION

The present invention provides lidding for closing a container, the lidding comprising a substrate and a layer of sealant supported by said substrate, said sealant being capable of providing a seal for the container to which the lidding is heat sealed and easy peelability by adhesive failure between said sealant and said container so as to leave said container free of sealant, said layer consisting essentially of a blend of (a) 50 to 97% by weight of a copolymer of ethylene with 12 to 40% by weight based on the weight of the copolymer of an unsaturated ester selected from the group consisting of vinyl acetate and $C_1$-$C_4$ alkyl acrylate or methacrylate and (b) complementally, to total 100% of (a) plus (b), with 3 to 50% by weight of a terpolymer of ethylene with 1 to 18% by weight based on the weight of the terpolymer of unsaturated acid or anhydride thereof and 3 to 40% by weight based on the weight of the terpolymer of unstaurated ester selected from the group of vinyl acetate and $C_1$-$C_4$ alkyl acrylate or methacrylate, the components (a) and (b) of said blend having sufficient compatibility so as to have a greater cohesive strength than the peel strength of the seal between said sealant and said container, the blend of said sealant being capable of providing a seal with said container which exhibits a peel strength which is substantially insensitive to seal temperature.

Figure 5:
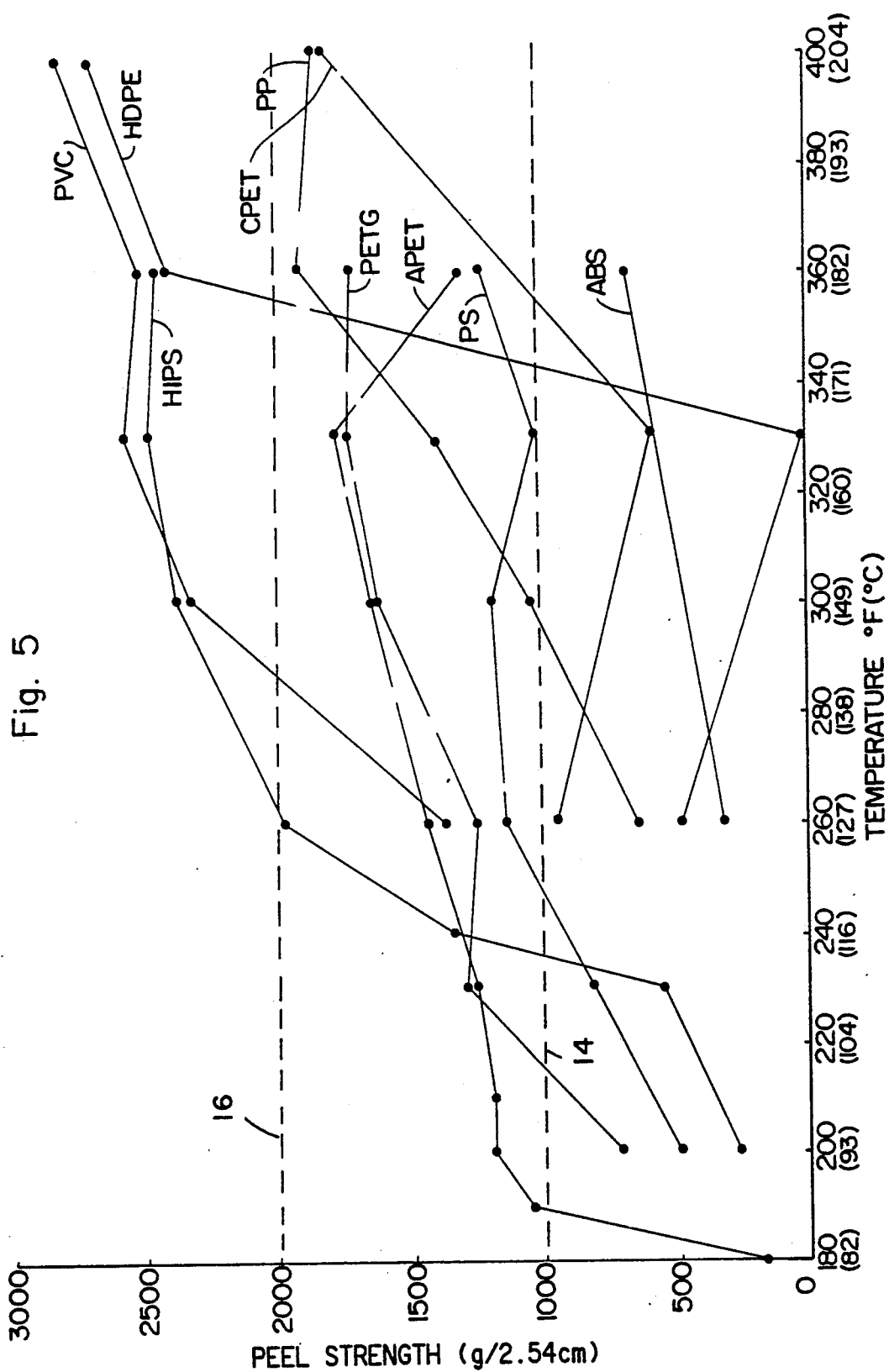
FIG. 5 shows a graph of the variation of peel strength of lidding outside the scope of the present invention as a function of heat seal (platen) temperature for a variety of container materials.
Figure 6:
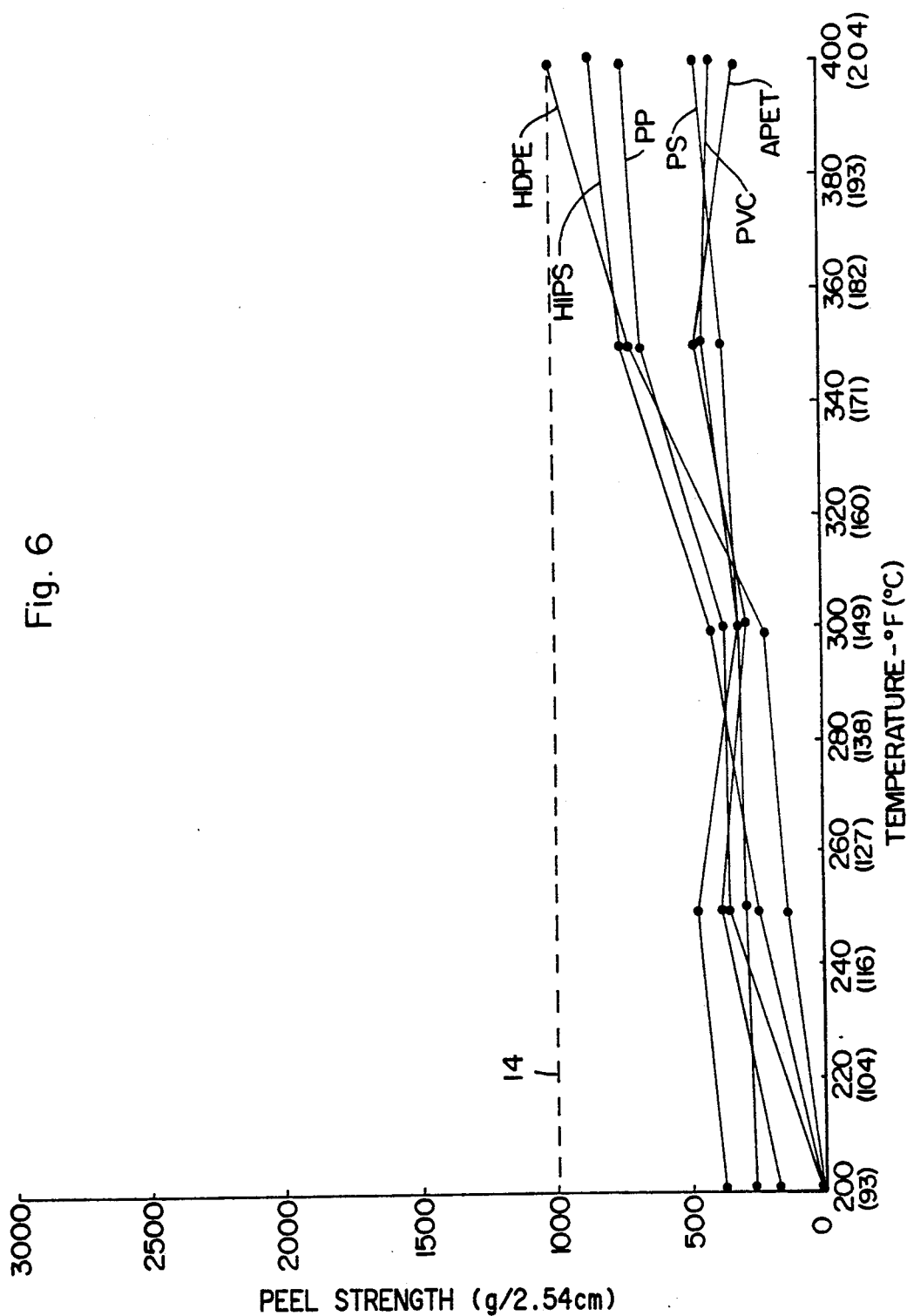
FIGS. 6 and 7 each show a graph of the variation of peel strength of lidding outside the scope of the present invention, using individual copolymers rather than polymer blends as t he sealant composition, for a variety of container materials.
Figure 7:
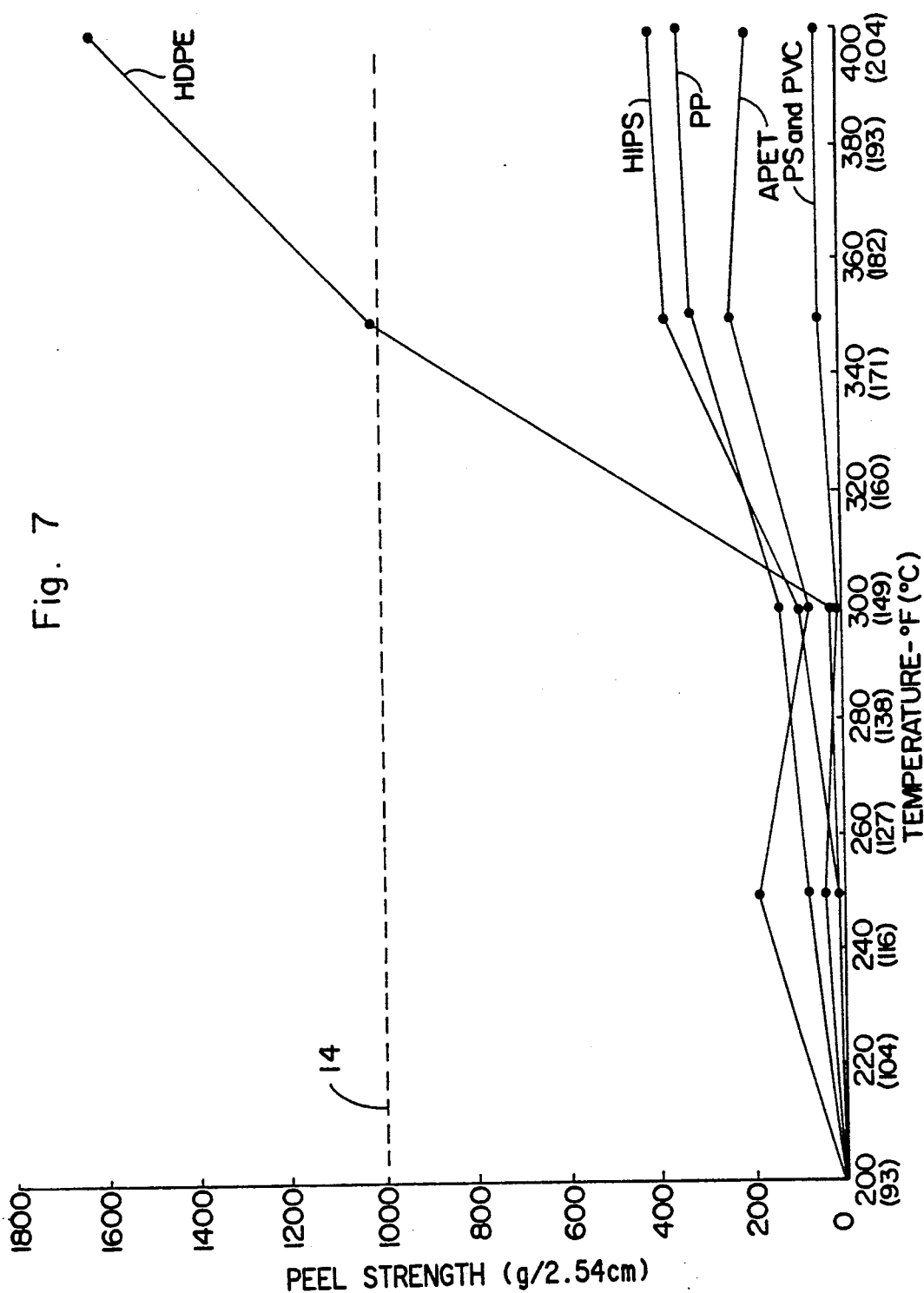

The vertical scale in FIG. 7 is expanded, for the sake of clarity, in comparison with the vertical scales shown in FIGS. 2 through 6.

Figure 1:
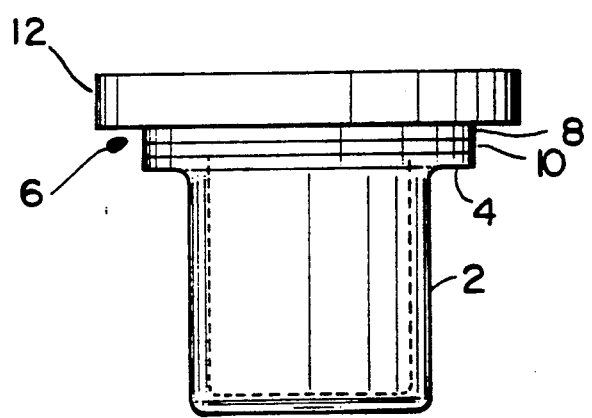
FIG. 1 shows schematically in side elevation a representative container sealed with lidding of the present invention.

In FIG. 1, a container 2 is shown having a top opening defined by an outwardly extending lip 4. The container is closed by lidding 6 which as shown comprises a substrate 8 and a layer of sealant 10 supported by the substrate and sealed to the lip of the container. A heating platen 12 is shown in contact with the outer surface of the lid to illustrate the source of heat for effecting the seal at the interface between the sealant 10 and lip 4 of the container. In FIG. 1 the thicknesses of lip 4 and sealant layer 10 are exaggerated for visual clarity and the platen 12 will have already normally been removed from the lid so that the seal can develop when cooled. This invention is not limited by the geometry of the container or its extended flange or lip shown in FIG. 1. It is only necessary that the container, regardless of shape, have a surface surrounding the opening in the container, to which the lidding can be sealed.

Figure 2:
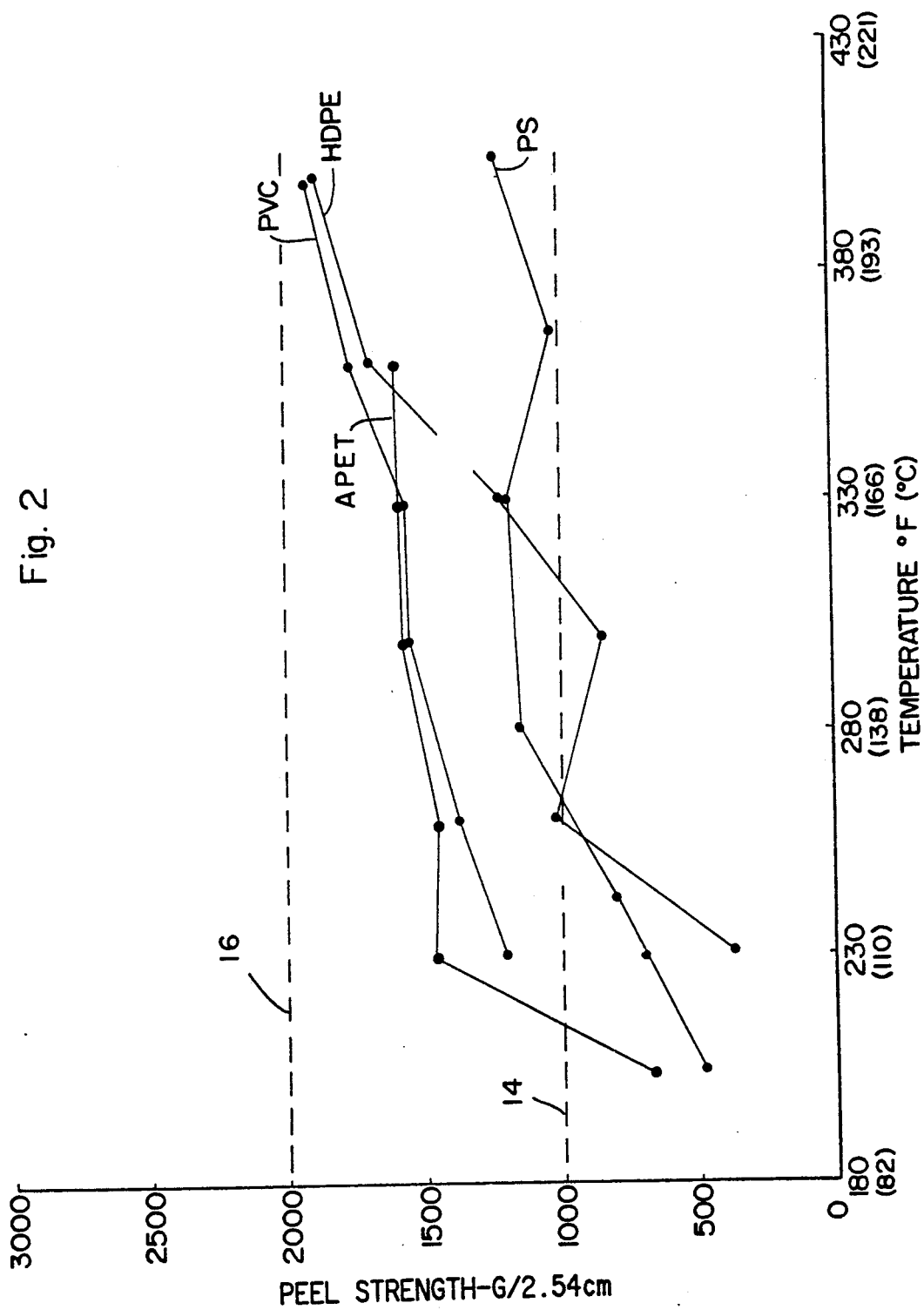
FIGS. 2, 3 and 4 each show a graph of the variation of peel strength of lidding of the present invention as a function of heat seal (platen) temperature for a variety of container materials.
Figure 3:
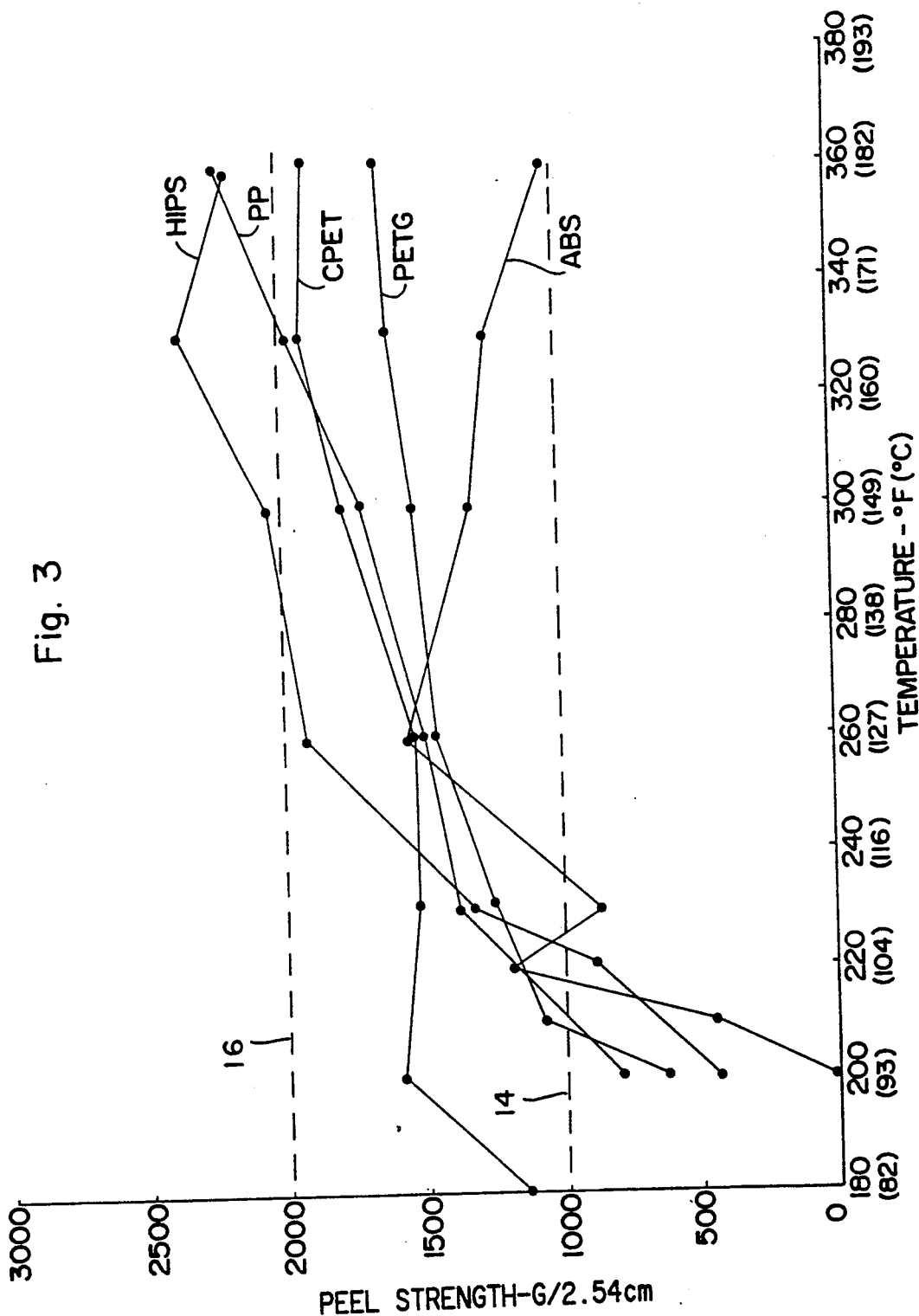

FIG. 2 shows the result of subjecting lidding such as depicted in FIG. 1 to peel testing with a wide variety of container materials. The sealant used to obtain the results shown in FIG. 2 is the sealant of Example 1. The increase in peel strength with increasing platen temperature is shown to occur but at a gradual rate spanning temperature ranges, e.g., 100° F., constituting a range broader than seal temperature variations within a given sealing operation. The seal temperature variation in a given sealing operation is likely to be within a range of 50° F. FIG. 3 also shows the peel strength results for the sealant used in Example 1 for additional container materials, also in the desired range of relatively easy peelability, i.e., 500 to 2200 g/2.54 cm. and to be achievable on a wide variety of container materials.

Figure 4:
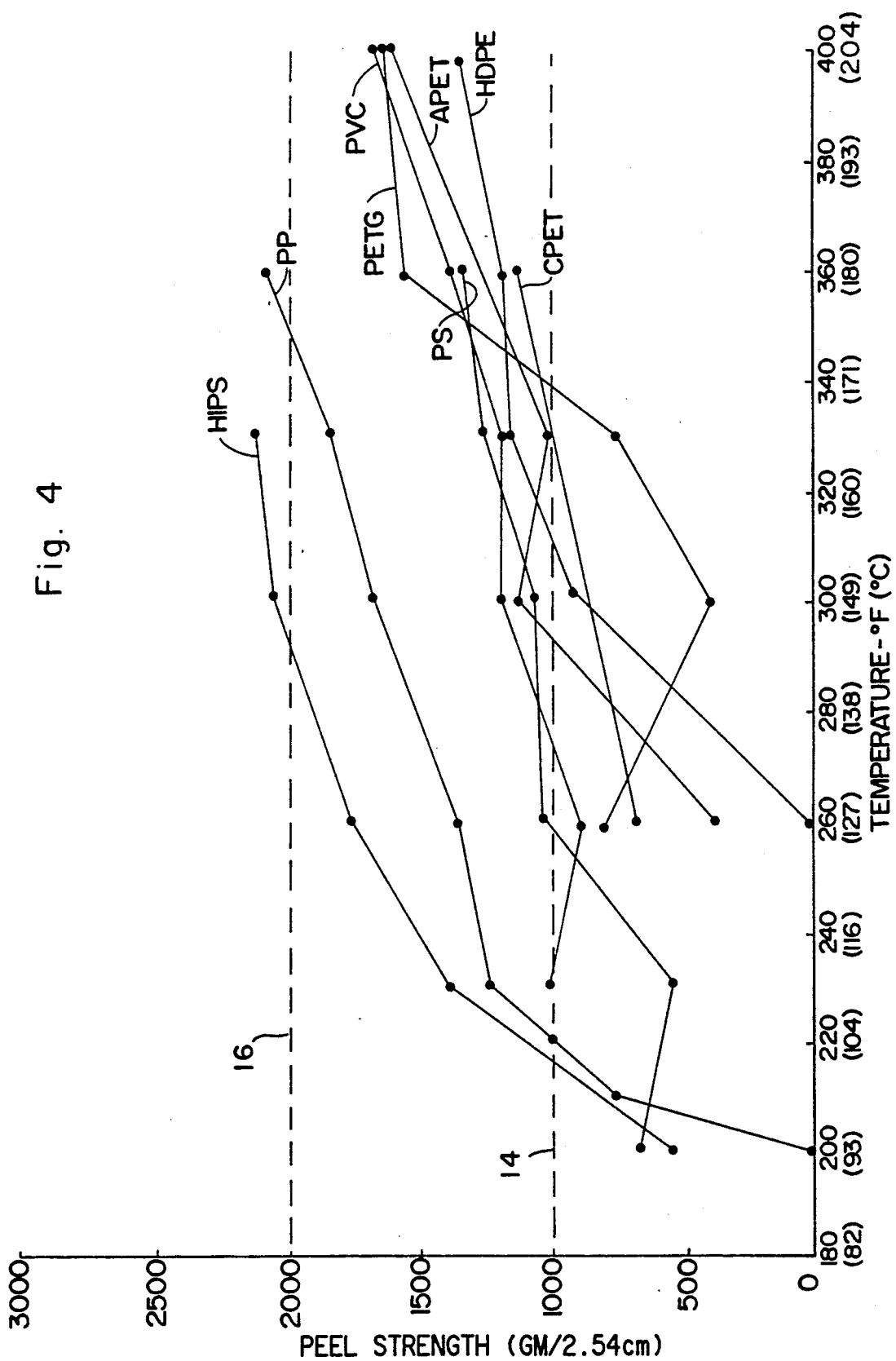

The preferred peel strength range of 1000 to 2000 g/2.54 cm is indicated by dashed lines 14 and 16, respectively, in FIGS. 2–5 and just dashed line 14 is shown in FIGS. 6 and 7 corresponding to the lower end of the preferred range.

FIG. 4 shows similar good peel strength performance using a different sealant, namely that of Example 2, for lidding of the present invention.

FIG. 5 shows the effect on peel strength of substituting ionomer and ethylene acid copolymer for the terpolymer component of sealant compositions used in lidding of the present invention. This is the sealant composition used in the Comparative Examples under A hereinafter. For glycol-modified polyethylene terephthalate (PETG), polystyrene (PS), and amorphous polyethylene terephthalate (APET), satisfactory peel strength in the sense of substantial uniformity over a temperature range of 50° F. and in the sense of absolute strengths measured, within the range of secure but peelable bonding is obtained. For the other container materials, however, the results were generally unsatisfactory in the sense that the peel strengths were either too low or too high or showed wide variation with varying heat seal temperature. For HDPE as the container material, the indication of zero peel strength at 330° F. (165° C.) is probably spurious, but the trend of sharply increasing peel strength resulting from heat seal temperatures increasing from 260° F. (127° C.) to 350° F. (176° C.) is unmistakable and is an undesirable variation in peel strength.

FIGS. 6 and 7 each slow the effect on peel strength of using individual polymers as the sealant composition instead of blends of these polymers in accordance with the present invention. Specifically, the peel strength curves for the ethylene/vinyl acetate copolymer (EVA) and ethylene/isobutyl acrylate/methacrylic acid (E/iBA/MAA) terpolymer, individually are shown in FIGS. 6 and 7, respectively. Further details on the experiments used to generate this data are disclosed in part B of the Comparative Examples. For the EVA copolymer, as shown in FIG. 6, the peel strengths are generally substantially uniform but generally deficient, e.g., a peel strength of at least 1000 g/2.54 cm is hardly achievable using EVA by itself as the sealant composition for any container material, except at 400° F. sealing temperature when the container material is HDPE. For the E/iBA/MAA terpolymer used as the sealant composition, as shown in FIG. 7, the peel strength is deficient except for HDPE as the container material, wherein the peel strength increases too sharply at heat seal temperatures exceeding 300° F. (149° C.).

DETAILED DESCRIPTION OF THE INVENTION

The lidding of the present invention comprises a substrate and a sealant layer supported by the substrate. Examples of substrate materials include, but are not limited to, aluminum foil, and paper and polymeric materials such as polypropylene, polyester, linear low density polyethylene (LLDPE) and polyamide homopolymers and copolymers. These substrate materials can be used in an oriented or unoriented state and can be combined with each other by commonly used methods such as coextrusion or adhesive lamination. Typically, the substrate will be a film when made from polymeric material, having a thickness on the order of 10 to 50 microns. The substrate will also have sufficient strength so as to withstand puncturing or breakage during normal handling. Other layers may be present in the lidding, such as barrier layer(s) and/or adhesive layer(s) formed on the substrate prior to or simultaneous with formation of the sealant layer on top of the barrier or adhesive layer, as the case may be.

The sealant layer has the copolymer and terpolymer components hereinbefore described. Each component will usually have a melt index of 0.1 to 100 g/10 min (ASTM D1238, condition 190/2.16).

Preferably, the unsaturated ester content of the ethylene copolymer component comprises 16 to 30% by weight of the weight of the copolymer and the melt index of this component is preferably in the range of 0.8 to 40 g/10 min. These copolymers are made by conventional polymerization techniques. Commercially available examples of this component include ethylene/vinyl acetate copolymer containing 25% by wt. of vinyl acetate and ethylene/methyl acrylate copolymer containing 20% by wt. of methyl acrylate.

In the terpolymer component, the preferred acid or anhydride monomer content is from 3 to 15% by weight based on the weight of the terpolymer, and the preferred unsaturated ester content is from 4 to 25% by weight based on the weight of the terpolymer. The preferred melt index for these terpolymers is from 1 to 50 g/10 min. Examples of unsaturated acid or anhydride monomers include acrylic acid, methacrylic acid, maleic acid, itaconic acid, fumaric acid, maleic anhydride, and methyl nadic anhydride. Examples of unsaturated esters include methyl acrylate, ethyl acrylate, isobutyl acrylate, normal butyl acrylate, methyl methacrylate, normal butyl methacrylate, and vinyl acetate. The terpolymers can be made by any polymerization method commonly utilized to manufacture polymers. These methods include high pressure polymerization methods, aqueous polymerization methods and graft polymerization methods.

Specific examples of terpolymer include ethylene/isobutylacrylate (10% by wt.)/methacrylic acid (10% by wt.) terpolymer, ethylene/vinyl acetate (28% by wt.)/methacrylic acid (1% by wt.) terpolymer, ethylene/maleic anhydride (3% by wt.)/n-butyl or ethyl acrylate (6% by wt. or 9% by wt.).

The proportions of copolymer and terpolymer components and the proportions of comonomers in each of these components is selected so as to provide the advantageous results for lidding of the present invention as described herein. Preferably, the proportion of copolymer in the blend and thus in the sealant layer will be 95 to 60% by weight and the proportion of terpolymer will be 5 to 40% by weight, to total 100% of the combined weight of these components.

The sealant layer can be made by melt blending together molding granules of the copolymer and terpolymer components. Included in the blend can be such conventional additives as amide slip agents, silica, microcrystalline wax, phenolic and other antioxidants and/or other additives for other modifications to the layer as might be required for surface modification. The selection of these additives and amounts will be such as not to interfere with the sealing relationship, described herein.

The slip and antiblock agents are conventional in the sense that they have been used in polymer films and layers to reduce surface tack and contact area with temporary contacting surfaces, respectively. These effects appear counter-productive to the lidding utility of the present invention. Nevertheless, the sealant layer used in the present invention can accommodate an effective amount of surface modifier, usually slip and antiblock agents, to permit the lidding to be rolled up for storage and handling and then unrolled without sticking to itself and still being capable of achieving the sealing ability described herein. Generally this effective amount for each agent will be about 0.05 to 2.5% based on the total weight of the copolymer and terpolymer components, with the total weight of surface modifier present in the layer being about 0.1 to 4.0% by wt. The preferred amount of slip and antiblock agents present in the sealant layer is about 0.1 to 2.0% by wt. of each agent.

The particular copolymers and terpolymers selected for the blend and their respective melt indices will be such that upon melting and extrusion of the blend, the resultant sealant layer will have compatibility between these polymer components indicated by a high cohesive strength, whereby in the ultimate lidding utility, the peeling away of the lidding from the container sealed thereby will result in adhesive failure between sealant layer and container, leaving no residue of lidding on the container lip.

Thus, when applied to containers and peeled away, the lidding of the present invention exhibits the following relationships. The cohesive strength of the sealant layer is greater than the peel strength of the sealant layer to the container (or container material). The adhesive strength of the sealant layer to the substrate, either by direct of indirect bonding, is greater than the peel strength of the sealant layer to the container. Accordingly, the cohesive strength and adhesive strength just described will both exceed the peel strength within the ranges described herein. Preferably the cohesive strength and adhesive strength will each exceed a peel strength of 2000 g/2.54 cm and more preferably will exceed a peel strength of 2200 g/2.54 cm so that the lidding will be universally useful to obtain the results desired.

In order to apply the sealant blend to the substrate, the blend can be melt coated onto one surface of the substrate, either directly or with the use of a coextrudable adhesive layer and/or with the use of conventional primers and adhesives on the substrate. The thickness of the sealant coating can be established by any techniques well known to those skilled in the art such as micoscopic analysis or basis weight calculations. Generally, the sealant layer will be 10 to 75 microns thick. Alternatively, the lidding can be formed in a single extrusion operation, by co-extruding the substrate, the sealant layer materials and any other layers of choice in between the sealant and substrate such as coextrudable adhesive layers, low cost polyolefin bulking layers or layers designed to minimize the permeation of gases such as water, oxygen or carbon dioxide.

Containers which can be sealed with lidding of the present invention can be made by conventional techniques, such as thermoformed cast sheet, injection molding or extrusion blow molding, either monolayer or multilayer. Materials of construction presented at the surface of the container to be sealed, i.e., at the container lip, can include any common container material such as acrylonitrile/butadiene/styrene polymer (ABS), crystalline polyethylene terephthalate (CPET), high density polyethylene (HDPE), low density polyethylene (LDPE), linear low density polyethylene (LLDPE), high impact polystyrene (HIPS), polyamide, glycol-modified polyethylene terephthalate (PETG), polypropylene (PP), polystyrene (PS), amorphous polyethylene terephthalate (APET), or polyvinyl chloride (PVC). These polymers may be modified and/or combined with other polymers in conventional ways to improve container strength and/or barrier or other properties. Thus, these container materials may contain small proportions of co-monomer, such as 1-butene or 1-octene in the case of LLDPE and ethylene in the case of PP.

Lidding of the present invention can be applied and sealed to containers by conventional methods such as described hereinbefore. The result is typified by the peel strengths depicted in FIGS. 2, 3, and 4, which show the sealant layer adhering to a wide variety of container materials providing peel strengths in the preferred peel region. Preferred peel strengths achievable by lidding of the present invention, i.e., sealant layer-to container, are from 1000 to 2000 g/2.54 cm.

As shown in FIGS. 2, 3, and 4, the peel strength of lidding of the present invention is relatively uniform over a considerable seal temperature range within the broad temperature ranges tested. Peel strength generally increases with increasing platen temperature, but this increase is gradual over selected parts of the temperature range tested, indicating the substantial seal temperature insensitivity of the sealant layer of the lidding of the present invention. In use, one would select the seal (platen) temperature within that part of the overall seal temperature range which gives the desired but relatively uniform peel strengths despite temperature variations occurring in the sealing operation. As shown in FIG. 2, within the range of 260°-330° F., the change in peel strength is relatively small, from the beginning of the range to the end. Thus for PVC, the change in peel strength is about 200 g/2.54 cm. The change is even less for rigid polystyrene and APET. HDPE which seems to show the greatest variation, in fact presents a relatively small change, from 1000 g/2.54 cm (260° F.) to 800 g/2.54 cm (300° F.) to 1100° at 330° F.

FIG. 3 shows similar results within the range of 230° to 330° F. for container materials made of PETG, polypropylene, and crystalline polyester, with a change less than 20% over this entire range. For high impact polystyrene, the preferred range would be 260°-300° F., while for ABS, from 260° to 360° F. would be a preferred platen temperature range.

Preferably, the peel strength of the sealant layer should not change more than 250 g/2.54 cm over a range of 40° F. which is selected from the overall seal temperature range and within which the desired peel strength is obtained. More preferably, this change in peel strength should not occur over a range of 50° F. so-selected. Sealing equipment can generally operate with fluctuations falling within a temperature range of 50° F. encompassing the temperature setting of the equipment, and the better equipment can usually operate within the temperature range of 40° F. Thus, the range of substantial temperature insensitivity of the sealant layer of lidding of the present invention enables relatively uniform sealing (peel strength) between sealant layer and container to be obtained during the course of prolonged sealing equipment operation.

The universal sealing applicability of lidding of the present invention is illustrated from FIGS. 2 and 3 in which desirable peel strengths remain within a range of 250 g/2.54 cm over a temperature range of 50° F. for seven out of the nine different container materials tested. The lidding tested in FIG. 4 satisfies this uniformity criteria for eight out of the eight container materials tested. Preferably, the lidding of the present invention satisfies this uniformity criteria for at least six of the nine container materials disclosed herein. In contrast, the lidding tested if FIG. 5 satisfies this uniformity criteria for only four out of the nine container materials tested.

The following are examples of the present invention (parts and percents are by weight unless otherwise indicated).

EXAMPLE 1

Lidding was prepared by first dry blending the sealant layer composition. This composition consisted of a mixture of 79% by weight ethylene/vinyl acetate copolymer having 28% copolymerized vinyl acetate and a melt flow rate of 6, 19% by weight of a terpolymer of ethylene, 10% isobutyl acrylate, and 10% methacrylic acid having a melt flow rate of 35, 1% by weight of an additive concentrate based on an ethylene methacrylic acid copolymer having 9% methacrylic acid and a melt flow rate of 10 containing 12.5% silica, and 1% by weight of an additive concentrate based on the same resin containing 20% N-oleyl palmitamide. The silica and palmitamide provide antiblock and slip properties respectively to the sealant layer. The mixture was dry blended together by tumbling in a rotating drum.

One mil (25.4 microns) of the blend was then extrusion coated at a melt temperature of 460° F. (238° C.) onto 2.0 mil (50.8 microns) aluminum foil using, with a conventional mixing screw, an extruder 4.5 inches in diameter with a length/diameter ratio of 28/1. The foil speed was 400 feet per minute. A matte chill roll at a temperature of 47° F. was used on the resultant lidding. The "A" wettable aluminum foil was flame treated with 3 flames in front and 3 in the rear prior to extrusion coating.

After the lidding was made, samples were cut out and heat sealed to the commercially available container materials shown in FIGS. 2 and 3. A Theller Heat Sealer was used with only the top jaw heated and the foil side of the lidding touching the top jaw. The platen temperature range tested was 200°-400° F. (93°-204° C.). A pressure of 40 pounds per square inch (PSI) and a dwell time of 1.0 seconds were also employed. Once the heat seals were made, the peel strength was measured as follows: sealed materials were cut into 1.0 inch wide strips and 4 seals were measured on an Instron tensile tester in order to obtain a peel strength reading. The samples were pulled apart at a rate of 12 inches per minute and the peak strengths were recorded as the peel strength required to pull the seal apart. The results of this test are indicated in FIGS. 2 and 3.

EXAMPLE 2

Lidding was prepared and tested in the same manner as explained in Example 1, except that the sealant layer composition considered consisted of a mixture of (a) 64% by weight ethylene/methyl acrylate copolymer having 20% copolymerized methyl acrylate and a melt flow rate (melt index) of 8, (b) 27% by weight of a terpolymer of ethylene, 10% isobutyl acrylate, and 10% methacrylic acid having a melt flow rate of 10, (c) 5% by weight of an additive concentrate based on an ethylene methacrylic acid copolymer having 9% methacrylic acid and a melt flow rate of 10 containing 12.5% silica, and (d) 4% by weight of an additive concentrate based on the same resin containing 20% N-oleyl palmitamide. The silica and palmitamide provide antiblock and slip properties respectively, to the sealant layer. For components (c) and (d) of the composition, the copolymer series as a carrier for incorporating the slip and anti-block agents into the composition. The extrusion coating of this sealant layer composition on the aluminum foil was carried out at a melt temperature of 570° F. (200° C.) because of the higher melting temperature of the composition of this Example as compared to the composition of Example 1. The peel strengths for the lidding of this Example are shown in FIG. 4.

EXAMPLE 3

Lidding was prepared as in Example 1 except that the sealant composition consisted of a mixture of (a) 64% by weight ethylene/vinyl acetate copolymer having 28% copolymerized vinyl acetate and a melt flow rate of 6, (b) 16% by weight of a terpolymer of ethylene, 10% isobutyl acrylate, and 10% methacrylic acid having a melt flow rate of 35, (c) 18% of the same terpolymer having a melt flow rate of 10, (d) 1% by weight of an additive concentrate based on an ethylene methacrylic acid copolymer having 9% methacrylic acid and a melt flow rate of 10 containing 12.5% silica, and (e) 1% by weight of an additive concentrate based on the same resin containing 20% N-oleyl palmitamide. The peel strength results for the lidding of this Example are similar to that of Example 1, except that the peel strength is generally slightly greater for the lidding of this Example, except in the case of ABS where peel strengths less than 1000 g/2.54 cm were obtained.

For the lidding of Examples 1, 2, and 3, the adhesive strength of the bond between the sealant layer and substrate and the cohesive strength of the sealant layer both exceeded the peel strength of the seal between the sealant layer and the container material for all the seal temperatures tested.

COMPARATIVE EXAMPLES

A. Lidding was prepared by first dry blending in a tumbling drum the sealant layer composition consisting of (a) 72% by weight ethylene vinyl acetate copolymer having 28% copolymerized vinyl acetate and a melt flow rate of 25, (b) 16% by weight of ionomer and a melt flow rate of 1.5, (c) 6% by weight of an ethylene methacrylic acid copolymer having 15% methacrylic acid and a melt flow rate of 25, (d) 4% by weight of an additive concentrate based on an ethylene methacrylic acid copolymer having 9% methacrylic acid and a melt flow rate of 10 containing 20% N-oleyl palmitamide, and (e) 3% by weight of an additive concentrate based on the same resin containing 12.4% silica. The silica and the palmitamide provide antiblock and slip properties respectively, to the sealant layer.

One mil (25.4 microns) of the blend was then coextrusion coated at a melt temperature of 460° F. onto 2.0 mil aluminum foil with a tie layer (50.8 microns thick) composed of a terpolymer of ethylene, 10% by weight isobutyl acrylate, and 10% by weight methacrylic acid based on the weight of the terpolymer, and having a melt flow rate of 10. All other aspects of this examples are the same as in the previous examples. As discussed hereinbefore, the peel strength results for the lidding of this comparative example is shown in FIG. 5, such results indicating that this lidding is not as effective as lidding of the present invention.

B. Lidding was made as described in A above except that the sealant compositions were solely made from either EVA copolymer having a vinyl acetate content of 18 wt. % and melt index of 2.5 g/10 min. or E/iBA/MAA terpolymer having an iBA content of 10 wt. % and MAA content of 10 wt. %, with the terpolymer having a melt index of 10 g/10 min. No slip or antiblock additives were included in the sealant layer, giving the individual copolymer and terpolymer the best opportunity for adhesion to the container materials of Example 1. Peel test results shown in FIGS. 6 and 7, respectively, indicate that these components of the sealant layer used individual), are generally not suitable as a lidding sealant layer.

As many widely different embodiments of this invention may be made without departing from the spirit and scope thereof, it is to be understood that this invention is not limited to the specific embodiments thereof except as defined in the appended Claims.

What is claimed is:

1. Lidding for closing a container, comprising a substrate and a layer of sealant supported by said substrate, said sealant being capable of providing a seal for said container to which the sealant is heat sealed and easy peelability by adhesive failure between said sealant and said container so as to leave said container free of sealant, said layer consisting essentially of a blend of (a) 50 to 97% by weight of a copolymer of ethylene with 12 to 40% by weight based on the weight of the copolymer of an unsaturated ester selected from the group consisting of vinyl acetate and $C_1$-$C_4$ alkyl acrylate or methacrylate and (b) complementally, to total 100% of (a) plus (b), with 3 to 50% by weight of a terpolymer of ethylene with 1 to 18% by weight based on the weight of the terpolymer of unsaturated acid or anhydride thereof and 3 to 40% by weight based on the weight of the terpolymer of unsaturated ester, the components (a) and (b) of said blend having sufficient compatibility so as to have a greater cohesive strength than the peel strength of the seal between said sealant and said container, the blend of said sealant being capable of providing a seal with said container which exhibits a peel strength which is substantially insensitive to seal temperature.

2. The lidding of claim 1 in combination with said container.

3. The lidding of claim 1 wherein the copolymer is ethylene/vinyl acetate.

4. The lidding of claim 1 wherein the terpolymer is ethylene/isobutyl acrylate/methacrylic acid.

5. The lidding of claim 1 wherein said container to which said sealant is heat sealed is selected from the group consisting of acrylonitrile/butadiene/styrene polymer, crystallized polyethylene terephthalate, high density polyethylene, low density polyethylene, linear low density polyethylene, high impact polystyrene, glycol-modified polyethylene terephthalate, polypropylene, amorphous polyethylene terephthalate, and polyvinyl chloride.

6. The lidding of claim 5 wherein said peel strength is 500 to 2200 g/2.54 cm.

7. The lidding of claim 6 wherein the substantial insensitivity of said peel strength to seal temperature is characterized by said peel strength not changing by more than 250 g/2.54 cm over a temperature range of 50° F.

8. The lidding of claim 5 wherein said peel strength does not change by more than 250 g/2.54 cm over a temperature range of 50° F. providing a peel strength of 500 to 2200 g/2.54 cm for at least six of said containers.

9. The lidding of claim 8 wherein said peel strength does not change by more than 250 g/2.54 cm within the peel strength range of 1000 to 2000 g/2.54 cm.

10. The lidding of claim 8 wherein the number of said containers is at least 8.

11. The lidding of claim 1 wherein said sealant layer contains an effective amount of surface modifier to permit said lidding to be rolled up and unrolled without sticking to itself.

12. The lidding of claim 11 wherein said surface modifier includes slip and antiblock agents.

13. The lidding of claim 12 wherein the effective amount of said surface modifier is about 0.05 to 2.5% based on the total weight of said copolymer and said terpolymer of said blend.

14. The lidding of claim 1 wherein said substrate is selected from the group consisting of aluminum foil, paper, and polymeric material.

15. A container having lidding heat sealed thereto for closure thereof, said lidding comprising a substrate and a layer of sealant adhered directly or indirectly to said substrate, said sealant being capable of providing a seal for said container by virtue of the heat sealing thereto and peelability by adhesive failure between said sealant and said container so as to leave said container free of sealant when said substrate is peeled from said container, with the adhesion of said sealant to said substrate being greater than the peel strength of the seal between said sealant and said container, said layer consisting essentially of a blend of (a) 50 to 97% by weight of a copolymer of ethylene with 12 to 40% by weight based on the weight of the copolymer of an unsaturated ester selected from the group consisting of an unsaturated ester selected from the group consisting of vinyl acetate and $C_1$–$C_4$ alkyl acrylate or methacrylate and (b) complementally, to total 100% of (a) plus (b), with 3 to 50% by weight of a terpolymer of ethylene with 1 to 18% by weight based on the weight of the terpolymer of unsaturated acid or anhydride thereof and 3 to 40% by weight based on the weight of the terpolymer of unsaturated ester, the components (a) and (b) of said blend having sufficient compatibility so as to have a greater cohesive strength than the peel strength of the seal between said sealant and said container, the blend of said sealant being capable of providing a seal with said container which exhibits a peel strength which is substantially insensitive to seal temperature.

16. The container of claim 15 composed of a material selected from the group consisting of acrylonitrile/butadiene/styrene polymer, crystallized polyethylene terephthalate, high density polyethylene, low density polyethylene, linear low density polyethylene, high impact polystyrene, glycol-modified polyethylene terephthalate, polypropylene, amorphous polyethylene terephthalate, and polyvinyl chloride.

17. The container of claim 15 wherein said substrate is selected from the group consisting of aluminum foil, paper, and polymeric material.

18. The container of claim 16 wherein said peel strength is 500 to 2,200 g/2.54 cm.

19. The container of claim 16 wherein said peel strength does not change more than 250 g/2.54 cm over a heat seal temperature range of 50° F.

* * * * *